United States Patent [19]
Bernd et al.

[11] Patent Number: 4,915,832
[45] Date of Patent: Apr. 10, 1990

[54] FILTER FOR OBTAINING PLASMA OR PLASMA WATER

[75] Inventors: Mathieu Bernd, Spiesen-Elversberg; Schulz Wolfgang, St. Wendel; Weber Wolfram, Spiesen-Elversberg, all of Fed. Rep. of Germany

[73] Assignee: Fresenius, AG, Fed. Rep. of Germany

[21] Appl. No.: 271,742

[22] Filed: Nov. 15, 1988

Related U.S. Application Data

[63] Continuation-in-part of Ser. No. 1,815, Jan. 8, 1987, Pat. No. 4,789,473.

[30] Foreign Application Priority Data

Jan. 10, 1986 [DE] Fed. Rep. of Germany ....... 3600527

[51] Int. Cl.$^4$ ............................................. B01D 13/01
[52] U.S. Cl. .......................... 210/321.8; 210/321.89; 210/456
[58] Field of Search ........... 210/321.72, 321.8, 321.81, 210/321.88, 321.89, 321.9, 323.2, 456; 55/158; 422/48

[56] References Cited

U.S. PATENT DOCUMENTS

| 3,704,223 | 11/1972 | Dietzsch et al. | 210/321.81 |
| 4,242,203 | 12/1980 | Amicel et al. | 210/456 |
| 4,425,234 | 1/1984 | Reitz | 210/321.8 |
| 4,640,773 | 2/1987 | Nishida et al. | 210/321.89 |
| 4,789,473 | 12/1988 | Mathien et al. | 210/321.8 |

Primary Examiner—W. Gary Jones
Attorney, Agent, or Firm—Pravel, Gambrell, Hewitt, Kimball & Krieger

[57] ABSTRACT

A filter having a filter housing with an interior within which, between two closure members, filter membranes in the form of hollow fibers are disposed. Between the hollow fibers a free flow space remains to which are connected two connected pieces disposed inclined on the housing.

Through the connecting pieces, blood is supplied to enable filtration from the outside to the inside of the fibers. The connecting pieces are angled so as to provide the lowest possible flow resistance.

3 Claims, 2 Drawing Sheets

FILTER FOR OBTAINING PLASMA OR PLASMA WATER

RELATED APPLICATIONS

This is a continuation in part of application Ser. No. 001,815 filed Jan. 8, 1987 now U.S. Pat. No. 4,789,473. Applicant claims priority under 35 USC § 119 based on West German Patent Application No. P3600527.4, having a filing date of Jan. 10, 1986.

BACKGROUND OF THE INVENTION

1. Field of Invention

The invention relates to a hollow fiber filter for obtaining plasma or plasma water.

2. General Background

Known plasma filters comprise a housing which includes a blood inlet and a blood outlet and an interior. In the interior of the filter housing, a filter membrane is arranged in the form of a plurality of hollow fibers which extend in the longitudinal direction of the housing. The hollow fibers act as capillaries in the filter. The inter-fiber space within the interior forms a "free flow" space in the housing. Blood flows through the hollow fibers and filtrate is drawn through the free flow space. The filtering is effected by pores in the walls of the hollow fibers and by a pressure gradient between the hollow fiber interior and the free flow space which can be produced, for example, by connecting a pump to the free flow space to introduce a transmembrane pressure gradient.

The known filters further comprise a plasma outlet which is in flow communication with the free flow space. The end faces of the hollow fibers are provided with closure members which are usually formed as sealing or casting compound regions and separate the blood inlet and outlet from the plasma outlet. The casting compound regions completely seal both the intermediate spaces between the fibers and the space between the fibers and the housing.

One disadvantage is that a high blood flow resistance opposes the blood flow in the interior of the capillaries and greatly restricts the blood flow. Consequently, a bypass is required with a relatively large blood flow. The bypass requires division of the blood flow into two flows, the amounts being determined by the pressure differences. Also, the filtrate space volume, or the free flow space outside the capillaries, is relatively large. Therefore, taking samples of plasma involves a considerable time delay known as "dead time", associated with filling the filtrate space volume.

SUMMARY OF INVENTION

Briefly, the present invention provides a hollow fiber filter for obtaining plasma or plasma water which permits samples to be taken without appreciably influencing the blood flow in its velocity or behavior.

The blood flow in the filter of the present invention is no longer through the capillaries but through the free flow chamber surrounding them. The free flow chamber has a substantially lower flow resistance than that of the combined internal cross-sections of the hollow fibers. When the cross-section of the free flow space is approximately equal to the flow cross-section of the lateral inlet or outlet tubular connections, it is possible to take a sample of plasma or plasma water practically without influencing the blood flow. If a pressure drop occurs in the blood flow, it is small, and furthermore, no dead times occur.

The filter according to the present invention is thus operated from the outside to the inside, i.e., blood flows through lateral connections around the hollow fibers and the plasma or plasma water recovered collects in the interior of the hollow fibers and is led away therefrom through axial connections. Filtrate is sucked from the space around the hollow fibers into their interior by a pump which provides a transmembrane pressure gradient.

The cross-section of the free flow space can be made large enough to filter blood flows of 20 to over 400 ml/min. without problems associated with prior art filters. In prior art filters, blood flow is limited by the internal volume of the hollow fibers.

The filter according to the present invention is, therefore, particularly suitable for continuous plasma recovery for monitoring or supervising electrolytes, glucose and medicaments. Moreover, it permits a so called closed-loop control of electrolyte concentrations in the dialysis as well as precise adjustment for a diabetic.

Two inlets and two outlets are provided, one inlet and one outlet each for blood and plasma respectively. The filter according to the present invention can be operated selectively from the inside to the outside, or from the outside to the inside of the fibers. Operation from the inside to the outside, i.e., blood supply through axial connections into the cavity of the filter capillaries, is suitable when very small blood flows are present because the relatively high flow resistance of the capillaries has no appreciable effect.

The lateral inlet and outlet tubular connections for blood or plasma are disposed laterally at the ends of the free flow space and inclined toward the axial end. By the arrangement of the lateral inlet and outlet connecting pieces at an acute angle of less than 90° with respect to the housing, blood flow velocity is improved as the blood flows on the outside of the hollow fibers. Investigations carried out showed that an angle of about 30° is a particularly favorable approach angle.

A further improvement of blood flow results when the closure or stopper members comprise at their surfaces adjacent to the housing interior an inclined face whose angle of inclination corresponds substantially to the angle of the lateral inlet or outlet connecting pieces with respect to the housing. This results in improved blood flow, and avoids dead spaces. Therefore, blood residues which form can be easily removed upon flushing the filter. The inclined faces of the cast members conform to segments of a circle.

DETAILED DESCRIPTION

Figure 1:
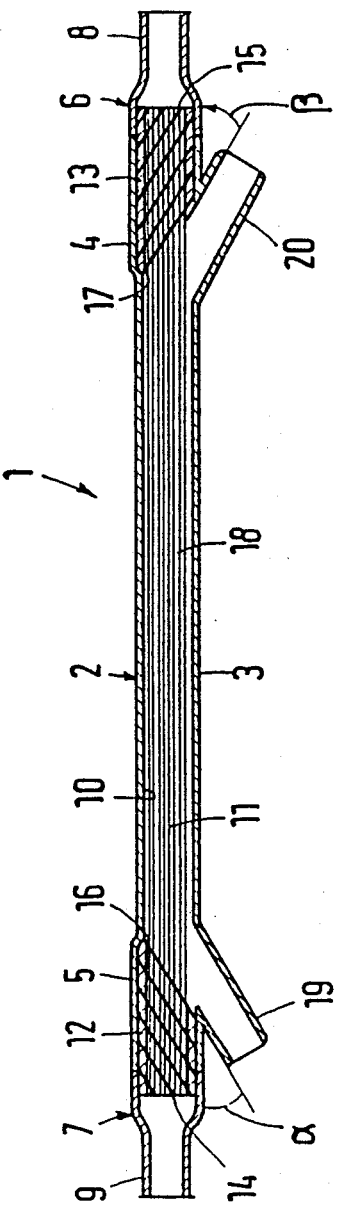
FIG. 1 shows a slightly simplified longitudinal cross-section of the filter made according to the invention.

FIG. 1 shows an embodiment of the hollow fiber filter 1 according to the invention which comprises a housing 2 having a cylindrical center portion 3 adjoined on either side by two likewise cylindrical but thickened end regions 4 and 5. Fitted to the end regions 4 and 5 are caps 6 and 7, respectively, each comprising bored tubular connecting pieces 8 and 9 to which blood supply and discharge lines, which are not shown, can be connected.

The housing 2 further comprises an interior chamber 10 which extends over the entire length of the center portion and end regions 4 and 5 and is in flow communication with the connecting pieces 8 and 9.

In the interior chamber 10, a filter membrane is disposed in the form of a plurality of hollow fibers 11 which extend in the longitudinal direction of the housing into the end regions 4 and 5. The hollow fibers are denoted in FIG. 1 by the reference numeral 11 and, to simplify the illustration, are shown only as longitudinal lines. The hollow fibers 11 have an inner volume whose diameter is preferably 200 μm. In the preferred embodiment of the hollow fiber filter 1, 85 of such hollow fibers 11 are disposed in the interior chamber 10 and have a total surface of about 100 sq. cm. The hollow fibers 11 can be made of materials such as polypropylene capillaries which are rendered hydrophilic. However, other suitable hydrophilic membranes may also be used. Between the hollow fibers 11 in the interior chamber 10 of the housing 2, a flow space 18 remains whose cross-section corresponds to the difference of the internal cross-section of the interior chamber 10 minus the combined cross-section of all of the hollow fibers 11.

It is further apparent from FIG. 1 that in the end regions 4 and 5 of the housing 2, casting compound members 12 and 13 are disposed, each having an outwardly directed end face 14 and 15. The outwardly directed faces 14 and 15 are arranged substantially perpendicular to the longitudinal axis of the housing 2. The slightly curved end faces 16 and 17, opposite said end faces 14 and 15, adjacent to the interior chamber 10 are, however, inclined i.e., at an angle of less than 90° to the longitudinal axis of the housing 2. The cast members 12 and 13 surround the end regions of the hollow fibers 11 and also seal the intermediate spaces between the hollow fibers 11 in their end regions so that the cylindrical center portion 3 of the housing 2 is sealed by the casting compound members 12 and 13 from the connecting pieces 8 and 9 and from the caps 6 and 7. The center portion 3 and the interior chamber 10, therein, are bordered by the casting composition members 12 and 13.

The end faces of the hollow fibers 11 in the plane of the end faces 14 and 15 of casting compound members 12 and 13 are open so that a flow passage is possible from the connecting pieces 8 and 9 into the hollow fibers 11.

Since the hollow fibers 11 are formed as filter membranes with corresponding filter openings, a fluid passage is further possible from the interior of the hollow fibers 11 into the flow space 18 between the hollow fibers 11 or, from the flow space 18 into the interior of the hollow fibers 11. This fluid passage can be influenced in its direction and magnitude by the pressure differential applied.

The housing 2, as illustrated in FIG. 1, further includes another inlet connecting piece 19 and an exit connecting piece 20. It is possible to freely define the inlet and outlet direction so that the connecting piece 20 can be considered an inlet and the connecting piece 19 an outlet. The inlet and outlet connecting pieces 19 and 20 open into the interior chamber 10 in the region of the casting compound members 12 and 13 respectively and are disposed at an acute angle α or β to the longitudinal axis of the housing. As apparent from FIG. 1, the inclined position of the lateral inlet and outlet connecting pieces 19 and 20, respectively, correspond substantially to the inclined position of the curved end faces 16 and 17 of the casting compound members 12 and 13. This has a favorable influence on the flow behavior of the fluid introduced and discharged through the lateral inlet and outlet connecting pieces 19 and 20, respectively. In addition, it is apparent from the illustration in FIG. 1 that the casting compound members 12 and 13 with their end faces 16 and 17 extend into the end regions 4 and 5 of the housing 2 to such an extent that no dead spaces whatever arise in which liquid residues could collect which could not subsequently be removed from the interior chamber 10 on flushing the hollow fiber filter 1. For this purpose, the end faces 16 and 17 are flush with the inlet and outlet connecting pieces 19 and 20, respectively, and the innermost edges of faces 16 and 17 terminate approximately in the region of the transition from the thickened end regions 4 and 5 to the cylindrical center portion 3, effectively forming an extension of the lateral inlet and outlet pieces 19 and 20 into the housing 2.

In the embodiment illustrated in FIG. 1, it is possible to connect the lateral inlet and outlet connecting pieces 19 and 20 to the blood supply and discharge lines (not shown), so that the blood flow takes place into the flow space 18, i.e., outside the hollow fibers 11. The advantage is that the blood flow is opposed only by an extremely low flow resistance which can be further reduced by adjusting the cross-section of the free flow space 18 to match that of the blood inlet and outlet lines not shown in FIG. 1.

In addition, trouble-free blood flow is further promoted by the inclined arrangement of the inner surfaces of the inlet and outlet connecting pieces 19 and 20 which permits an extremely favorable flow passage into the interior chamber 10 of the housing 2.

Using this flow path, the lateral inlet and outlet connections 19 and 20 of hollow fiber filter 1 are connected to the blood lines, not shown. Filtration results from the flow of filtrate from the flow space 18 into the hollow fibers 11 so that a plasma sample may be obtained through the connecting piece 8 or 9 or through both. If only one connecting piece 8 or 9 is required to discharge the plasma or plasma water, the other can be sealed by a corresponding plug.

Alternatively, blood supply and discharge lines may be connected to connecting pieces 8 and 9, so that filtration is also possible from the interior of the hollow fibers 11 into the outer flow space 18. Thus, a filtration from the inside to the outside occurs, in which the plasma or plasma water collected is then removed through one or both lateral inlet or outlet connecting pieces 19 and 20. This type of connection is suitable in particular for very low blood flow rates because the increased flow resistance of the capillaries 11 does not have a great effect.

Irrespective of the nature of the connection of the hollow fiber filter 1, the particular pressure difference required for performing the filtration is obtained by applying a pressure differential by means of a pump which also extracts the filtrate recovered. On connecting the blood lines to the free flow space 18 through lateral connecting pieces 19 and 20, a blood flow from 20 to over 400 ml/min. can be implemented.

Figure 2:
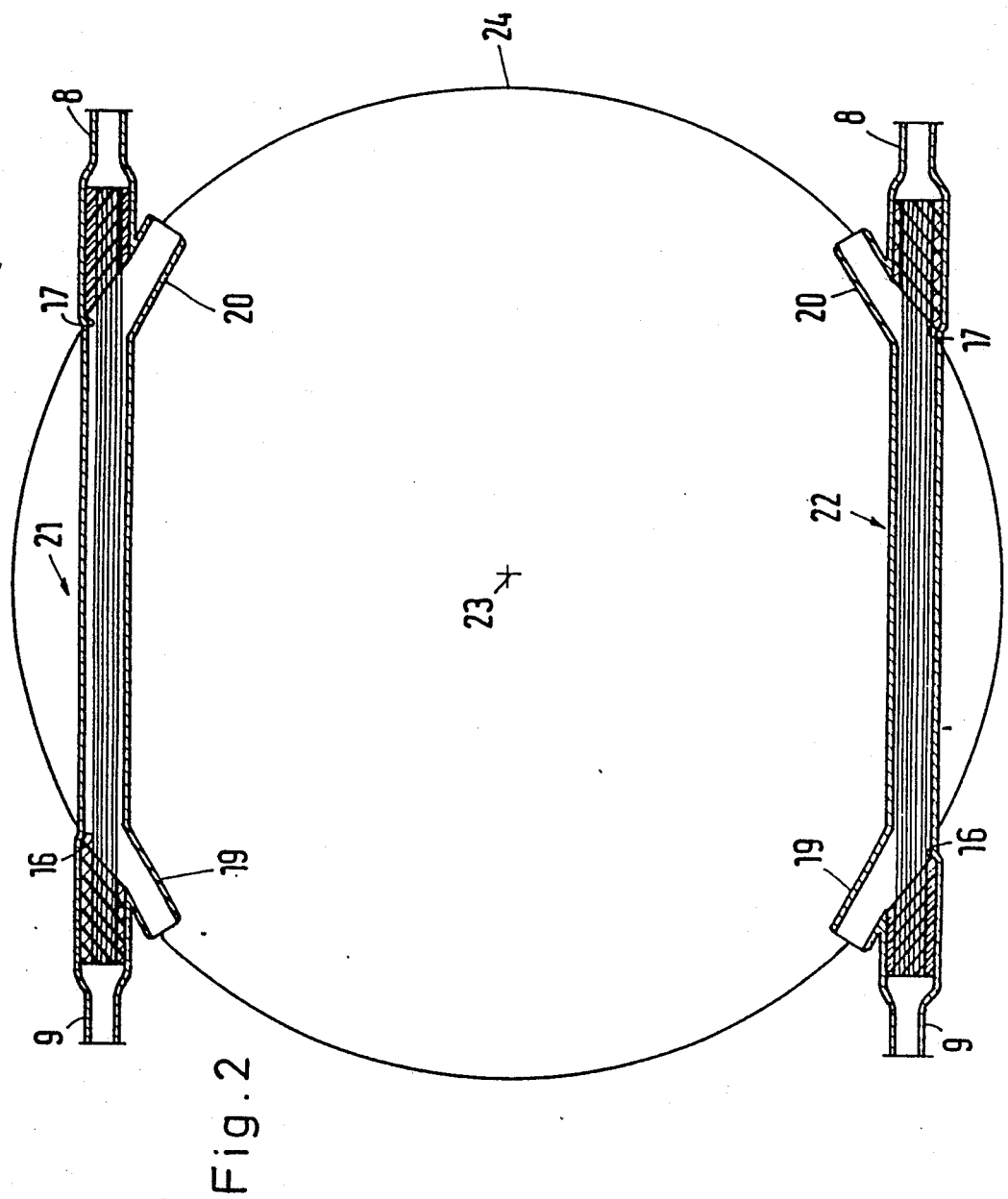
FIG. 2 shows a view corresponding to FIG. 1 of two filters in their position during the making of the closure or sealing members.

FIG. 2 shows an arrangement of two filters 21 and 22 according to the invention, whose structure and function corresponds exactly to that of the hollow fiber filter 1, according to FIG. 1, so that in this respect reference can be made to the description of FIG. 1.

The illustration in FIG. 2 is intended to show the arrangement of filters 21 and 22 in the production of end closure members 12 and 13. Filters 21 and 22 are disposed in a plane parallel to each other on a suitable support surface, such as a plate, so that the inlet and outlet connecting pieces 19 and 20 are pointed toward each other. If the lateral inlet and outlet connecting pieces 19 and 20 were connected with lines perpendicular to the longitudinal axis of the two filters 21 and 22, an octagon would form. The spacing of filters 21 and 22 is dependent upon the angle at which the inlet and outlet connecting pieces 19 and 20 are connected to the housing 2 of filters 21 and 22, thereby determining the inclination of end faces 16 and 17 within end regions 4 and 5.

Said filters 21 and 22 may be sealed by means of a centrifuge and a casting or sealing compound, preferably of polyurethane, wherein said casting or sealing compound is provided to connecting pieces 8 and 9 by means of feed lines not illustrated in FIG. 2. Further, the surface or plate on which filters 21 and 22 are disposed, is rotatably mounted, the pivot point, designated in FIG. 2 as 23, being disposed between filters 21 and 22. The axis of rotation extends through point 23 perpendicular to the plane of the plate, such that the axis of rotation does not intersect the longitudinal axis of either filter 21 or filter 22. The plate is rotated about pivot point 23 as the sealing or casting compound is provided to filters 21 and 22 through connecting pieces 8 and 9. The forces produced by rotation automatically form end faces 16 and 17 in the desired inclined position. It is apparent from FIG. 1 that end faces 16 and 17 are parts of circle 24 about the axis of rotation 23, while connecting pieces 19 and 20 form secants of said circle 24.

After casting operations, the outwardly directed insides of cast members 12 and 13 are cut off to expose the openings of the hollow fibers 11. Thereafter, the caps 6 and 7 are placed on the end regions 4 and 5 containing the embedded hollow fibers 11 and connected to housing 2.

We claim:

1. A hollow fiber filter for obtaining plasma or plasma water, comprising:
   (a) a hollow, tubular housing having an interior chamber, a longitudinal axis and open ends;
   (b) a plurality of elongated hollow fibers, disposed within said housing and being substantially parallel to said longitudinal axis of said housing and extending the length of said housing;
   (c) two casting compound members disposed within said open ends of said housing, effectively sealing both ends of said housing, while permitting the passage of said hollow fibers therethrough, thereby defining a free flow space within said housing, said free flow space having a cross-sectional area equal to the cross-sectional area of said interior chamber less the combined cross-sectional area of said hollow fibers, and said casting compound members each having a curved face adjacent to said free flow space forming a segment of a cylinder, said curved face being disposed non-perpendicular to said longitudinal axis of said housing;
   (d) at least two hollow fluid flow connectors, each having a longitudinal axis, said fluid flow connectors sealingly affixed to, and forming an intersection with said housing in close proximity to said casting compound members and in flow communication with said free flow space, said connectors being disposed in a manner in which said longitudinal axis of each fluid flow connector forms an acute angle with respect to said longitudinal axis of said housing, the cross-sectional area of said intersection between said flow connectors and said housing being approximately equal to the cross-sectional area of said free flow space, forming means to improve fluid flow through said connectors and housing, and reducing turbulent or stagnant flow characteristics; and
   (e) at least one plasma outlet, said outlet being connected to, and in communication with said hollow fibers external to said casting compound members and said free flow space.

2. The hollow fiber of claim 1, wherein said acute angle is approximately 30° (degrees) with respect to said longitudinal axis of said housing.

3. The hollow fiber filter according to claim 1 or 2, wherein said longitudinal axis of each of said fluid flow connectors lies in a plane substantially parallel with adjacent said faces of said casting members, said longitudinal axis of each of said connectors intersecting said longitudinal axis of said housing forming a second plane which is perpendicular to the cylinder of which adjacent said faces of said casting members form segments.

* * * * *